No. 895,339. PATENTED AUG. 4, 1908.
L. W. CAMPBELL.
TROLLEY.
APPLICATION FILED JAN. 4, 1907.
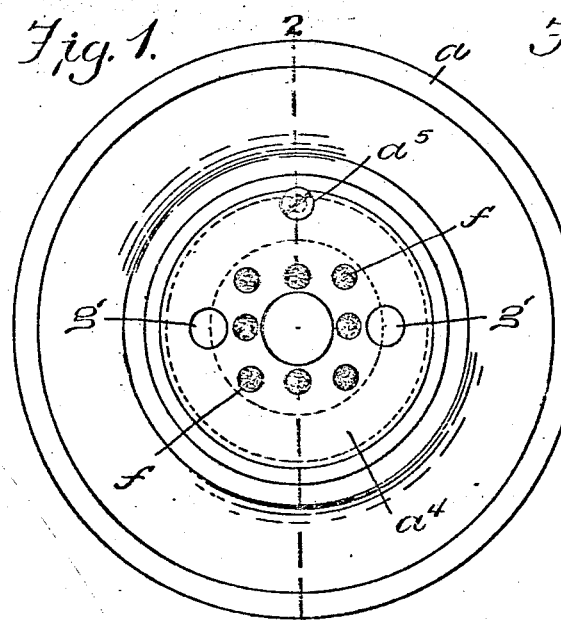
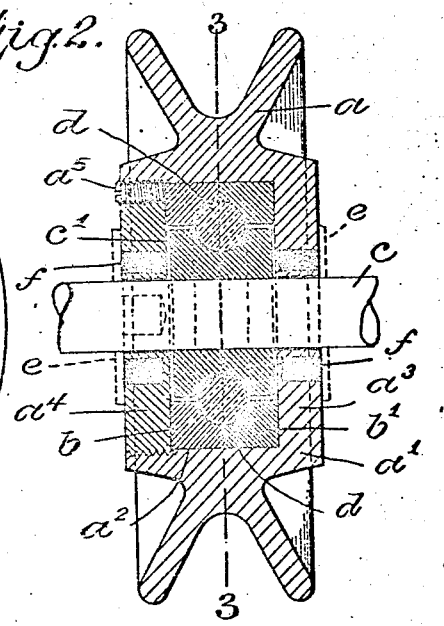
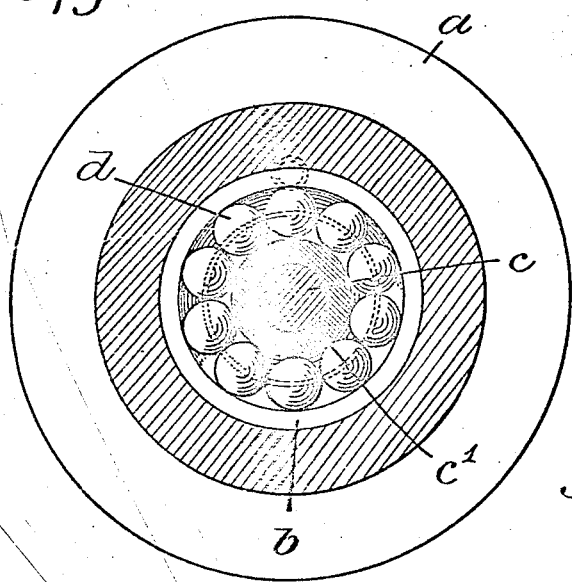
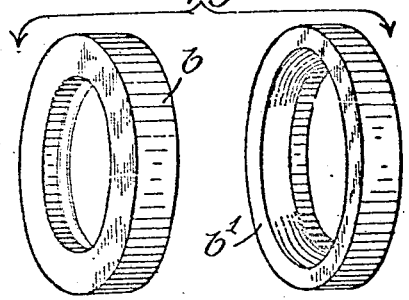
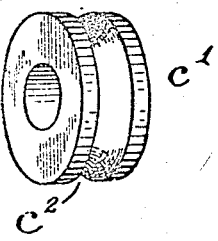
Witnesses.
Inventor.

UNITED STATES PATENT OFFICE.

LEON W. CAMPBELL, OF WOONSOCKET, RHODE ISLAND.

TROLLEY.

No. 895,339.  Specification of Letters Patent.  Patented Aug. 4, 1908.

Application filed January 4, 1907. Serial No. 350,804.

*To all whom it may concern:*

Be it known that I, LEON W. CAMPBELL, of Woonsocket, in the county of Providence and State of Rhode Island, have invented certain new and useful Improvements in Trolleys, of which the following is a specification.

This invention has relation to trolleys.

When operated under present conditions, a trolley such as employed on the various street car lines in which the car motors receive their current from an overhead conductor, has a short life. In cases where the trolley has a sliding contact upon its bearing, the rapidity with which the trolley rotates causes it to wear out with rapidity, and where it has been proposed to mount the trolley upon ball-bearings so as to obviate the frictional or sliding contact referred to, the passage of the current through the cones and balls, causes arcs to be formed with the consequent destruction of the bearing.

Consequently, the primary object of the present invention is to provide a trolley which may be used continuously for a relatively great length of time without becoming unduly warmed or inefficient.

To this end, I propose to mount the trolley upon an anti-friction bearing such as a ball-bearing, so as to obviate a sliding contact of the trolley upon its shaft or arbor; and to prevent the formation of arcs within the bearing. I propose to form the cones or races of electrically non-conducting material, so that the current cannot find its way therethrough. In order that the current may be conducted from the trolley to its arbor and thence through the harp to the motor, some portions of the trolley are caused to make contact with the shaft or arbor, or other appliance used for conducting the current from the trolley to the arbor.

Referring to the accompanying drawings illustrating a similar embodiment of the invention. Figure 1 represents the trolley in side-elevation. Fig. 2 represents a section through the same on the line 2—2 of Fig. 1. Fig. 3 represents a section on the line 3—3 of Fig. 2. Fig. 4 represents the cones or external ball races, and Fig. 5 represents the inner race.

On the drawings, $a$ indicates the trolley which has the usual external form so that it will make proper contact with the aerial conductor. In the hub $a'$ is a large cavity $a^2$, one end wall of which is formed by the end $a^3$ of the hub. Into this cavity are forced two races or cones $b\ b'$. The shaft or arbor $c$ is provided with a double cone or inner race $c'$ which is peripherally grooved as at $c^2$, so as to receive between it and the cones $b\ b'$, the balls or spheres $d$. Into the open end of the cavity and the hub is screwed a threaded disk or wall $a^4$ which is apertured to receive a screw $a^5$, by which the cones $b\ b'$ are rigidly secured in proper relation to each other and to the inner race or double cone $c'$.

As previously indicated, I propose that the current shall not traverse the antifriction bearing, and to this end I preferably form one or both of the cones $b\ b'$ and $c'$ of some nonconducting material such as fibroid or other hard compound or material which will stand the wear and at the same time serve as a nonconductor of electricity.

In order that the current may pass from the trolley to the arbor, I preferably employ metallic washers $e\ e$ which make contact with the end walls $a^3\ a^4$, and with the arbor $c$. These washers are held against axial movement by any suitable fastening devices. As a detail of construction, I propose to form cavities in the end walls $a^3\ a^4$ and to fill the same with graphite as indicated at $f$, so as to lubricate the contacting surfaces of the washer and the trolley to prevent wear thereof. For the purpose of providing convenient means for securing the end wall $a^4$ in place, it is formed with apertures $g\ g$ to receive a spanner or other tool.

Having thus explained the nature of the invention and described a way of constructing and using the same, although without attempting to set forth all of the forms in which it may be made, or all of the modes of its use, I declare that what I claim is:—

1. The combination with a shaft or arbor, of a trolley, an antifriction bearing interposed between the trolley and the arbor comprising complemental races and rotatable elements therebetween, one or more of said races being formed of insulating material.

2. The combination with a shaft or arbor, of a trolley having a cavity in its hub, and end walls for said cavity of which one is removable, an antifriction bearing located in said cavity, and comprising complemental races and rotatable elements therebetween, one or more of said races being formed of insulating material, and washers on said arbor bearing against the end walls of the cavity to conduct the current from the trolley to the arbor.

In testimony whereof I have affixed my signature, in presence of two witnesses.

LEON W. CAMPBELL.

Witnesses:
M. B. MAY,
A. L. FOLSOM.